United States Patent [19]

Gay et al.

[11] Patent Number: 4,769,409

[45] Date of Patent: Sep. 6, 1988

[54] SINGLE-COMPONENT, STORAGE-STABLE DIORGANOPOLYSILOXANE CVE COMPOSITIONS

[75] Inventors: Michel Gay, Lyons; Michel Letoffe, Sainte Foy Les Lyon; Pierre-Michel Peccoux, Lyons, all of France

[73] Assignee: Rhone-Poulenc Chimie, Courbevoie, France

[21] Appl. No.: 43,592

[22] Filed: Apr. 28, 1987

[30] Foreign Application Priority Data

Apr. 28, 1986 [FR] France .................................. 86 06367

[51] Int. Cl.$^4$ ................................................ C08K 5/54
[52] U.S. Cl. ...................... 524/188; 524/267; 524/860; 528/18; 528/28; 528/34; 528/901
[58] Field of Search .................... 524/188, 267, 860; 528/18, 28, 34, 901

[56] References Cited

U.S. PATENT DOCUMENTS

| | | | |
|---|---|---|---|
| 4,495,331 | 1/1985 | Chung ................................. | 528/18 |
| 4,513,115 | 4/1985 | Beers ................................... | 524/267 |
| 4,523,001 | 6/1985 | Swiger et al. ........................ | 528/18 |
| 4,537,944 | 8/1985 | Imai et al. ........................... | 524/267 |

FOREIGN PATENT DOCUMENTS 0113849  1/1986  European Pat. Off. .

*Primary Examiner*—Melvyn I. Marquis
*Attorney, Agent, or Firm*—Burns, Doane, Swecker & Mathis

[57] ABSTRACT

Single-component diorganopolysiloxane compositions which are storage-stable in the absence of atmospheric moisture and which crosslink into silicone elastomeric state in the presence of moisture, are comprised of an alkoxy-terminated diorganopolysiloxane, a functionalization catalyst containing a primary or secondary amine group, a tin condensation catalyst, a filler material, and an effective stabilizing amount of an alkyl or aryl isocyanate-substituted diorganopolysiloxane.

12 Claims, No Drawings

SINGLE-COMPONENT, STORAGE-STABLE DIORGANOPOLYSILOXANE CVE COMPOSITIONS

CROSS-REFERENCE TO RELATED APPLICATION

Copending application Ser. No. 043,422, filed concurrently herewith and assigned to the assignee hereof.

BACKGROUND OF THE INVENTION

1. Field of the Invention:

The present invention relates to a single-component diorganopolysiloxane composition exhibiting improved stability when it is stored in the absence of moisture, but which crosslinks at ambient temperature (typically 5°–35° C.) in the presence of water. A composition of this type is referred to below as a CVE composition (cold vulcanizable elastomeric composition).

The subject compositions are prepared principally by mixing hydroxylated diorganopolysiloxane polymers, fillers, particular polyalkoxylated silanes, organic or organosilicon amino compounds and metal or organometallic carboxylates or chelates.

2. Description of the Prior Art:

Compositions prepared by mixing constituents which are closely related to those enumerated above are known to this art. Certain of these compositions are not stable when stored; they are, therefore, referred to as two-component compositions because of the fact that they must be packaged in two different packs with, for example, the hydroxylated diorganopolysiloxane polymers, the fillers and the alkoxylated silanes in one of the packs, and the amino compounds and the metal salts in the other pack.

This two-pack form is not very practical (especially for applications in building construction, which are quite frequently performed in the open air), in view of the facts that the contents of one of the packs have to be carefully mixed with the contents of the other only at the point in time of ultimate use and that all of the formed compositions must be used immediately.

Compositions of this type are described, in particular, in Belgian Pat. No. 774,830, and French Pat. Nos. 2,152,908 and 2,228,814.

Belgian Pat. No. 774,830 describes compositions prepared by mixing hydroxylated or alkoxylated diorganopolysiloxanes, alkoxylated silanes (or polysiloxanes), linear aminoalkylpolysiloxanes containing at least one aminoalkyl radical and at least one alkoxy radical, and curing catalysts.

French Pat. No. 2,152,908 describes compositions prepared by mixing hydroxylated diorganopolysiloxanes, alkoxylated silanes (or polysiloxanes), fillers, aminoorganosilanes containing hydrolyzable radicals and curing catalysts.

French Pat. No. 2,228,814 describes compositions prepared by mixing hydroxylated diorganopolysiloxanes, methylpolysiloxane resins, fillers, alkoxylated aminoorganosilanes (or aminoorganopolysiloxanes) and, if appropriate, alkyl silicates or polysilicates.

Other such compositions are stable when stored; they are referred to as single-component compositions and are packaged in a single pack.

Compositions of this latter type are disclosed, for example, in U.S. Pat. Nos. 3,161,614, 3,170,894 and 3,686,357 and in published Japanese Application 53/102,956.

U.S. Pat. Nos. 3,161,614 and 3,170,894 describe compositions prepared by mixing diorganopolysiloxanes blocked by a polyalkoxysiloxy unit at each end of their polymer chain and hardening catalysts, such as organic or organosilicon amines. These compositions are characterized by the presence of poorly accessible diorganopolysiloxanes principally obtained by the action of chloroalkoxysilanes on hydroxylated diorganopolysiloxanes; in addition, they set slowly when exposed to air, and this entails storing the assemblies bonded with the subject compositions, in workshops, for at least several days.

U.S. Pat. No. 3,686,357 describes compositions prepared by mixing diorganopolysiloxanes blocked by a polyalkoxysiloxy unit at each end of their polymer chain, linear aminoalkylpolysiloxanes, also blocked by a polyalkoxysiloxy unit at each end of their polymer chain, and hardening catalysts. These compositions are characterized by the presence of two kinds of polysiloxanes, the preparation of each of which requires a special processing step. Furthermore, their viscosity tends to increase during their storage. This increase in viscosity interferes to a considerable degree with their capacity for extrusion through the nozzles of the cartridges wherein they are typically packaged.

Japanese Application No. 53/102,956 describes compositions prepared by mixing organopolysiloxanes, each of which contains at least two silicon atoms bonded to alkoxy groups, crosslinking systems obtained by heating alkoxylated silanes (or polysiloxanes) with tin salts of carboxylic acids, and alkoxylated aminoorganosilanes. These compositions are characterized by the presence of, on the one hand, organopolysiloxanes which are not as accessible as the hydroxylated organopolysiloxanes and, on the other hand, crosslinking systems, the preparation of which requires a heating stage.

European Pat. No. EP-A No. 21,859 proposes a major step forward by way of a single-component CVE composition capable of being prepared in a single stage directly from the hydroxylated diorganopolysiloxane base polymers and from specific polyalkoxysilanes. According to this patent, the introduction of functional groups into the hydroxylated base polymer may be carried out by means of an organofunctional silane which also serves as the adhesion agent.

These single-component compositions may, however, exhibit inadequate storage stability.

According to recently published patent applications (EP-A No. 69,256, EP-A No. 104,179 and FR-A No. 2,543,562), this inadequate stability would appear to be due to the presence of residual silanols originating from the hydroxylated base polymer and which would not appear to be reacted with the polyalkoxysilanes.

Thus, European Patent Application Nos. EP-A-69,256 and EP-A-104,179 and French Patent Application No. FR-A-2,543,562 suggest, with the goal of removing these residual silanols, the addition of a "scavenger" to the CVE composition which may be, respectively, a silane containing a labile hydrolyzable group which reacts preferentially with the residual silanol groups, a polysilazane and an organic compound containing at least one functional group which reacts with the silanol group.

As utilized hereinafter, by the term "stable", as applied to a single-component CVE composition containing an organopolysiloxane having alkoxy end groups according to the present invention, there is intended a mixture capable of setting when exposed to moisture, capable of remaining essentially unaltered when it is protected against atmospheric moisture, and which sets to an elastomer state which is not tacky to the touch even after an extended storage period. Furthermore, a "stable CVE composition" also connotes that the time which elapses to attain a nontacky state to the touch using the ingredients of a CVE composition which have been freshly mixed under atmospheric conditions will be essentially the same as that which elapses using the same mixture of ingredients subjected to atmospheric moisture after having been stored in a moisture-free and moisture-resistant container for an extended period of storage under ambient conditions, or an equivalent period based on accelerated aging at an elevated temperature.

After lengthy and expensive investigations, the present inventors have now established that the deterioration of the CVE compositions when stored appears to be principally due to the simultaneous presence in such CVE compositions of, on the one hand, the condensation catalyst based on a metal, especially tin, and, on the other hand, the catalyst for introducing functional groups into the hydroxylated oils, namely, a primary or secondary amine which catalyzes the reaction of the hydroxylated base polymer with the polyalkoxysilane, even when such catalyst composition.

SUMMARY OF THE INVENTION

Accordingly, a major object of the present invention is the provision of improvedly stable CVE compositions by incorporating therein an effective stabilizing amount of at least one diorganopolysiloxane having the formula:

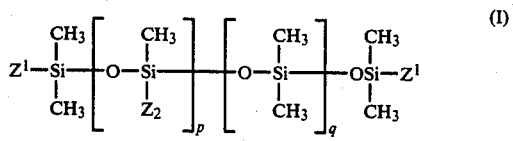

in which:

p is an integer from 1 to 6, inclusive, preferably from 2 to 4, inclusive;

q is an integer ranging from 0 to 500, preferably from 5 to 50, inclusive;

the radicals $Z^1$, which may be identical or different, are each a methyl radical or a radical $Z^2$, and $Z^2$ is a radical of the formula:

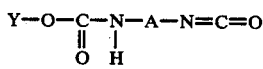

in which:

Y is a straight or branched chain alkylene radical containing from 1 to 18 carbon atoms, optionally extended by a polyether radical selected from among the polyethylene oxides and polypropylene oxides, and A is a divalent hydrocarbon radical containing from 2 to 20 carbon atoms, inclusive, and which constitutes a hydrocarbon residue of a diisocyanate molecule; A can thus be a divalent hydrocarbon radical selected from among straight or branched chain or cyclic alkylene radicals containing from 2 to 15 carbon atoms, inclusive, and a $C_6$-$C_{20}$ arylene radical containing not more than two unsaturated $C_6$ rings.

In the diorganopolysiloxane of the formula (I), the methylsiloxane recurring units onto which an isocyanate has been grafted are preferably separated by at least 1, preferably at least 2 dimethylsiloxane recurring units. In such case, the copolymer of formula (I) may be alternating or random.

Exemplary of the radicals Y, those of the following formulae are representative:

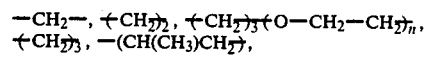
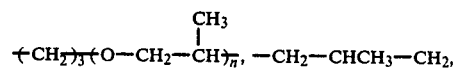

with n being an integer of from 5 to 50.

Exemplary of the radicals A, representative are those of the formulae:

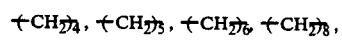

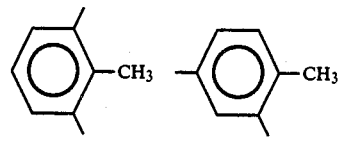

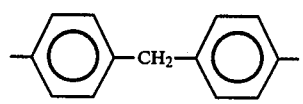

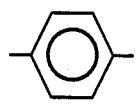

DETAILED DESCRIPTION OF THE PREFERRED EMBODIMENTS OF THE INVENTION

More particularly according to the present invention, it has now surprisingly and unexpectedly been found, unlike the stabilizers described in EP-A No. 69,256, EP-A No. 104,179 and FR-A No. 2,543,562, that the stabilizer of formula (I) does not react with the residual silanol or alcohol groups, but reacts only with the primary and secondary amine groups of the functionalization catalyst.

In accordance herewith, it has been found that the removal of only these amine groups enables the CVE compositions to be stabilized efficiently. Furthermore, the stabilizers according to the invention are completely compatible with silicones, are not toxic and do not discolor the CVE compositions when heated; they can also serve as a plasticizer.

The present invention thus makes it possible to remove the primary and secondary amine groups from the functionalization catalyst without necessarily going through the costly stage of devolatilization of the CVE composition by heating under reduced pressure. Furthermore, such devolatilization does not completely eliminate the catalyst, especially when the latter is of low volatility.

In the description which follows, all percentages and parts are given by weight, unless otherwise indicated.

The present invention thus features a single-component organopolysiloxane composition capable of being vulcanized at ambient temperature, stable when stored in the absence of moisture and capable of being converted into elastomeric state in the presence of moisture, comprising:

(i) 100 parts of at least one diorganopolysiloxane polymer of the formula:

$$R^2{}_{3-a}R^1{}_aSi(OSiR_2)_rSiR^1{}_aR^2{}_{3-a} \quad (II)$$

in which each R, which may be identical or different, is a hydrocarbon radical containing from 1 to 10 carbon atoms, optionally substituted by halogen atoms or cyano groups, each $R^1$, which may be identical or different, is a $C_1$–$C_{10}$ hydrocarbon radicals, each $R^2$, which may be identical or different, is an alkoxy or polyalkoxy radical of the formulae ZO or ZOEO, in which Z is a $C_1$–$C_4$ alkyl radical, E is a straight or branched chain $C_2$–$C_4$ alkylene radical, a is zero or 1 and the symbol r is a number having such value that the polymer of the formula (II) has a viscosity of from 500 to 1,000,000 mPa.s at 25° C.;

(ii) 0 to 15 parts of at least one polyalkoxysilane of the formula:

$$R^1{}_aSir^2{}_{3-a} \quad (III)$$

in which $R^1$ and $R^2$ are as defined above;

(iii) 0 to 250 parts of inorganic filler material;

(iv) 0.001 to 3 parts of a condensation catalyst;

(v) 0.001 to 15 parts of at least one amino compound bearing at least one primary or secondary amine group and selected from among the organic amines having a pKb of less than 5 in aqueous media and aminoorganosilanes and aminoorganopolysiloxanes simultaneously bearing, per molecule:

at least one $C_3$–$C_{15}$ organic radical bonded to the silicon atom by an SiC bond and bearing at least one amino group, and at least one $C_1$–$C_5$ alkoxy radical, or $C_3$–$C_6$ alkoxyalkyleneoxy radical; and (vi) an effective stabilizing amount of at least one diorganopolysiloxane of the formula (I).

The polymer (i) of formula (II) is prepared by contacting an alpha,omega-dihydroxydiorganopolysiloxane polymer of the formula:

$$H\text{—}(OSiR_2)_r\text{—}OH \quad (IV)$$

with a polyalkoxysilane of the formula (III), in which formulae R, $R^1$ and $R^2$ are as defined above, in a proportion of at least two moles of polyalkoxysilane per mole of hydroxylated polysiloxane.

This reaction is carried out in the presence of at least one compound (v), for example, a primary or secondary organic amine (U.S. Pat. No. 3,542,901 and European Patent EP-A No. 21,859), an N,N-disubstituted hydroxylamine (French Pat. No. 2,508,467), or an aminoorganosilane (EP-A No. 21,859).

The alpha,omega-dihydroxydiorganopolysiloxane polymers having a viscosity of 700 to 1,000,000 mPa.s at 25° C., preferably 1,000 to 700,000 mPa.s at 25° C., are linear polymers consisting essentially of diorganosiloxy recurring units of the formula $R_2SiO$, and blocked by a hydroxyl group at each end of their polymer chain; however, the presence of monoorganosiloxy recurring units of the formula $RSiO_{1.5}$ and/or of siloxy recurring units of the formula $SiO_2$ is not excluded, in a proportion not exceeding 2% relative to the number of diorganosiloxy recurring units.

The hydrocarbon radicals containing from 1 to 10 carbon atoms, substituted or otherwise by halogen atoms or cyano groups, represented by the symbols R, include, for example:

(1) alkyl and haloalkyl radicals containing from 1 to 10 carbon atoms, such as methyl, ethyl, propyl, isopropyl, butyl, pentyl, hexyl, 2-ethylhexyl, octyl, decyl, 3,3,3-trifluoropropyl, 4,4,4-trifluorobutyl and 4,4,4,3,3-pentafluorobutyl radicals;

(2) cycloalkyl and halocycloalkyl radicals containing from 1 to 10 carbon atoms, such as cyclopentyl, cyclohexyl, methylcyclohexyl, propylcyclohexyl, 2,3-difluorocyclobutyl and 3,4-difluoro-5-methylcycloheptyl radicals;

(3) alkenyl radicals containing from 2 to 4 carbon atoms, such as vinyl, allyl and 2-butenyl radicals;

(4) monocyclic aryl and haloaryl radicals containing from 6 to 10 carbon atoms, such as phenyl, tolyl, xylyl, chlorophenyl, dichlorophenyl and trichlorophenyl radicals; and (5) cyanoalkyl radicals, in which the alkyl moieties contain from 2 to 3 carbon atoms, such as β-cyanoethyl and γ-cyanopropyl radicals.

Methyl, phenyl, vinyl and 3,3,3-trifluoropropyl radicals are the preferred.

As specific examples of recurring units of the formula $R_2SiO$, representative are those of the formulae:

$(CH_3)_2SiO$
$CH_3(CH_2\!=\!CH)SiO$
$CH_3(C_6H_5)SiO$
$(C_6H_5)_2SiO$
$CF_3Ch_2CH_2(CH_3)SiO$
$NC\text{—}CH_2CH_2(CH_3)SiO$
$NC\text{—}CH(CH_3)CH_2(CH_2\!=\!CH)SiO$
$NC\text{—}Ch_2CH_2(C_6H_5)SiO$ It will be appreciated that the polymer used may be a mixture of alpha,omega-dihydroxydiorganopolysiloxane polymers which differ from each other in molecular weight and/or the nature of the groups bonded to the silicon atoms.

These alpha,omega-dihydroxydiorganopolysiloxane polymers are readily commercially available. In addition, they may easily be prepared using the methods which are now well known to this art.

For purposes of illustration, the diorganopolysiloxane polymers (i) may be blocked at each end of their polymer chain by units of the formulae:

$(CH_3O)_2CH_3SiO_{0.5}$
$(CH_3O)_3SiO_{0.5}$
$(CH_3OCH_2CH_2O)_2CH_3SiO_{0.5}$
$(CH_3OCH_2CH_2O)_3SiO_{0.5}$

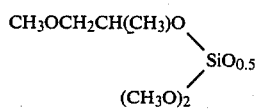

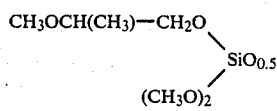

For every 100 parts of polymer (i) having the formula (II), 0 to 15 parts, preferably 2.5 to 10 parts, of a polyalkoxysilane (ii) having the formula (III) are used, in which:

$R^1$ is a $C_1$–$C_{10}$ hydrocarbon radical which, more especially, includes:

$C_1$–$C_5$ alkyl radicals, such as methyl, ethyl, propyl, isopropyl, butyl, isobutyl, tert-butyl, n-pentyl and isopentyl radicals;

$C_2$–$C_4$ alkenyl radicals, such as vinyl, allyl and 2-butenyl radicals;

$C_5$–$C_8$ cycloalkyl radicals, such as cyclopentyl, cyclohexyl and methylcyclohexyl radicals; and monocyclic $C_6$–$C_{10}$ aryl radicals, such as phenyl, tolyl and xylyl radicals.

The $R^2$ radicals, which may be identical or different, are alkoxy or polyalkoxy radicals, as indicated above.

As specific examples of a compound of the formula (III), representative are those of the formulae:

$Si(OCH_3)_4$
$CH_3Si(OCH_3)_3$
$CH_3Si(OCH_2CH_2OCH_3)_3$
$Si(OCH_2CH_2OCH_3)_4$
$CH_2\!=\!CHSi(OCH_2CH_2OCH_3)_3$
$C_6H_5Si(OCH_3)_3$
$C_6H_5Si(OCH_2CH_2OCH_3)_3$
$Si(OCH_3)_2[OCH(CH_3)CH_2OCH_3]_2$
$CH_2\!=\!CHSi(OCH_3)_3$
$CH_2\!=\!CH\!-\!CH_2(OCH_3)_3$
$CH_2\!=\!C(CH_3)CH_2Si(OCH_3)_3$
$CH_2\!=\!CH\!-\!Si(OCH_3)_2[OCH(CH_3)CH_2OCH_3 9$

The fillers (iii) are used in a proportion of 0 to 250 parts, preferably 5 to 200 parts, per 100 parts of polymer (i).

These fillers may be introduced in the form of very finely divided materials whose mean particle diameter is less than 0.1 micrometer. These fillers include pyrogenic silicas and precipitated silicas; their BET specific surface area is generally greater than 40 $m^2/g$.

These fillers may also be in the form of more coarsely divided materials having a mean particle diameter greater than 0.1 micrometer. As examples of such fillers, representative are ground quartz, diatomaceous silicas, calcium carbonate, calcined clay, rutile titanium dioxide, iron, zinc, chromium, zirconium and magnesium oxides, the various forms of alumina (hydrated or otherwise), boron nitride, lithopone, barium metaborate, barium sulfate and ballotini; their specific surface area is generally less than 30 $m^2/g$.

These fillers may have been surface-modified by treatment with the various organosilicon compounds typically employed for such purpose. Thus, these organosilicon compounds may be organochlorosilanes, diorganocyclopolysiloxanes, hexaorganodisiloxanes, hexaorganodisilazanes or diorganocyclopolysiloxanes (French Pat. Nos. 1,126,884, 1,136,885 and 1,236,505; British Pat. No. 1,024,234). In the majority of cases, the treated fillers contain from 3 to 30% of their weight of such organosilicon compounds.

The fillers may be a mixture of several types of fillers of different particle size distribution; thus, for example, they may include 30 to 70% of finely divided silicas having a BET specific surface area greater than 40 $m^2/g$ and 70 to 30% of more coarsely divided silicas having a specific surface area of less than 30 $m^2/g$.

As the condensation catalyst (iv), there may be used at least one compound of a metal selected particularly from among iron, lead, tin, titanium and zirconium, which are well known to this art. Tin is the preferred metal, for example, in the form of tin monocarboxylates and dicarboxylates, such as tin 2-ethylhexanoate, dibutyltin dilaurate and dibutyltin diacetate (see Noll's text, *Chemistry And Technology Of Silicones,* 2nd Edition, page 337, Academic Press (1968)).

Hexacoordinated chelates of tin of valency (IV), such as those described in European Patent Application EP-A No. 147,323 and U.S. Pat. No. 4,517,337, are particularly suitable.

Also preferred are the condensation catalysts which are a mixture of a diorganotin bis($\beta$-diketonate) with an organic derivative of tin, also of valency (IV), but devoid of any $\beta$-diketonato group, and comprising at least one tin atom, each tin atom bearing two organic radicals bonded via an Sn—C bond, the remaining two valencies being satisfied by radicals selected from among organic or inorganic radicals linked by an SnO or SnS bond, by halogen atoms, by hydroxyl groups and by oxygen atoms.

These organic derivatives of tin of valency (IV) which are devoid of any $\beta$-diketonato group may be, in particular, tin salts corresponding to the formulae:

$A_2SnR^6_2$
$R^6_2SnO$
$AR^6_2SnOSnR^6_2A$

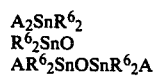

in which:

$R^6$ is a halogenated or nonhalogenated $C_1$–$C_{20}$ hydrocarbon radical,

A is a halogen atom or an organic or inorganic radical linked to the tin atom by an Sn—O or Sn—S bond, Q is a $C_2$–$C_{10}$ alkylene radical; A may be selected, for example, from among:

(e) monocarboxylate radicals of the formula $R^7COO$, $R^7$ being a halogenated or nonhalogenated $C_1$–$C_{20}$ hydrocarbon radical, and (2e) discarboxylate radicals of the formula

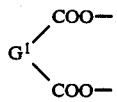

which are bonded to the same tin atom or to two tin atoms, resulting in the two formulae:

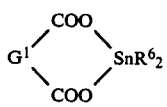

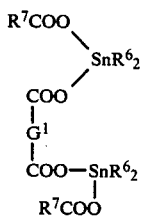

in which $G^1$ is a divalent $C_1$–$C_{15}$ hydrocarbon radical and $R^7$ is a defined under (e), and (3e) dicarboxylate radicals of the formula $R^7OCOG^1COO$, in which $R^7$ and $G^1$ are defined under (e) and (2e), respectively.

The above tin salts are well known to this art and are described, in particular, in the above text by Noll, and in U.S. Pat. Nos. 3,186,963 and 3,862,919, Belgian Pat. No. 842,305 and British Pat. No. 1,289,900.

Insofar as the compounds (v) bearing a primary or secondary amine group are concerned, organic amines, aminoorganosilanes and aminoorganopolysiloxanes are exemplary thereof. Among the organic amines, it is possible to use aliphatic amines, alicyclic amines, heterocyclic amines and arylaliphatic amines.

As specific examples of aliphatic amines, representative are: n-butylamine, amylamine, the amines of the formulae:

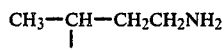
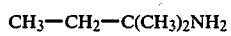

n-hexylamine, n-decylamine, laurylamine, hexadecylamine, n-octylamine, diisopropylamine, di-n-butylamine, diisobutylamine, di-n-hexylamine, ethylenediamine, propylenediamine, hexamethylenediamine, and polyamines of the formulae:

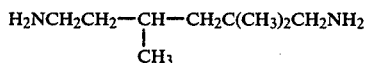
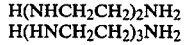
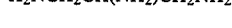

Exemplary of the alicyclic amines, representative are cyclopentylamine, cyclohexylamine and the amines of the formulae:

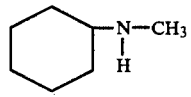 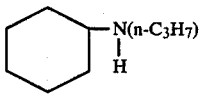

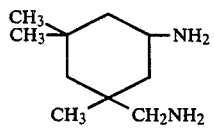

As specific examples of the heterocyclic amines, representative are: piperidine, pyrrolidine, piperazine and the amines of the formulae:

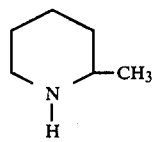 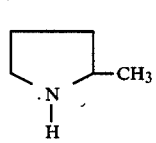

As specific examples of the arylaliphatic amines, representative are: benzylamine and phenylethylamine.

All of these organic amines are known to the art, as are various processes for the preparation thereof. Furthermore, very many of these amines are readily commercially available.

The compounds (v) may also be selected from the aminoorganosilanes and aminoorganopolysiloxanes, bearing, per molecule, at least one $C_3$–$C_{15}$ organic radical linked by an SiC bond to the silicon atom and substituted by at least one amino radical of a primary or secondary amine and at least one $C_1$–$C_5$ alkoxy or $C_3$–$C_6$ alkoxyalkyleneoxy radical.

Exemplary of the organoaminosilanes, representative are those of the following formulae, in which the organic group substituted by at least one amino radical is a hydrocarbon group:

$H_2N(CH_2)_3Si(OCH_2CH_2OCH_3)_3$
$H_2N(CH_2)_3Si(OCH_3)_3$
$H_2N(CH_2)_3Si(OC_2H_5)_3$
$H_2N(CH_2)_4Si(OCH_3)_3$
$H_2NCH_2CH(CH_3)CH_2CH_2SiCH_3(OCH_3)_2$
$H_2NCH_2Si(OCH_3)_3$
$HN(n.C_4H_9)CH_2Si(OCH_3)_3$
$H_2N(CH_2)_2NH(CH_2)_3Si(OCH_3)_3$
$CH_3NH(CH_2)_2NH(CH_2)_3Si(OCH_3)_3$
$H(NHCH_2CH_2)_2NH(CH_2)_3Si(OCH_3)_3$

The preparation of these silanes is described in U.S. Pat. Nos. 2,754,311, 2,832,754, 2,930,809 and 2,971,864.

Exemplary of the organoaminosilanes, representative are those of the following formulae, in which the organic group substituted by at least one amino radical is a hydrocarbon group comprising ether or thioether linkages:

$H_2N(CH_2)_3O(CH_2)_3Si(OCH_2CH_2OCH_3)_3$
$H_2N(CH_2)_3O(CH_2)_3Si(OCH_3)_3$
$C_2H_5NH(CH_2)_3O(CH_2)_3Si(OCH_3)_3$
$H_2N-CH_2-CH(CH_3)CH_2O(CH_2)_3SiC_6H_5(OCH_3)_2$
$H_2N(CH_2)_2S(CH_2)_3Si(OCH_2CH_2OCH_3)_3$
$H_2N(CH_2)_2S(CH_2)_3Si)OCH_3)_3$
$H(NHCH_2CH_2)_2S(CH_2)_3SiCH_3(OCH_3)_2$

The preparation of these silanes is described in U.S. Pat. Nos. 3,341,563, 3,551,375, 3,598,853 and 3,488,373.

The aminoorganopolysiloxanes which may be used may be prepared by the condensation of the above-mentioned aminoorganosilanes, and more particularly of the trialkoxylated aminoorganosilanes, such as those of the formulae:

$H_2N(CH_2)_3Si(OC_2H_5)_3$
$H_2N(CH_2)_3Si(OCH_3)_3$
$H_2N(CH_2)_2NH(CH_2)_3Si(OCH_3)_3$ with a dihydroxydiorganopolysiloxane polymer belonging to the class of the aforementioned polymers of the formula (IV).

Aminoorganopolysiloxanes prepared using this process are described in U.S. Pat. No. 3,686,375, European Application No. 50,453 and French Pat. Nos. 1,381,590, 1,385,693 and 2,228,814.

To improve adhesion, the compositions according to the invention may additionally contain, per 100 parts of (i), from 0.5 to 10 parts of at least one aminoorganosilane or aminoorganopolysiloxane (vii) bearing, per molecule, at least one $C_3$–$C_{15}$ organic radical linked by an SiC bond to the silicon atom and substituted by at least one amino radical comprising a tertiary amine and/or a guanidino radical, such as, for example, the guanidinoorganosilanes and the guanidinoorganopolysiloxanes described in U.S. Pat. No. 4,180,642 and at least one $C_1$–$C_5$ alkoxy group or a $C_3$–$C_6$ alkoxyalkyleneoxy radical.

As the adhesion promoters (vii), those more particularly preferred are the silanes of the formula:

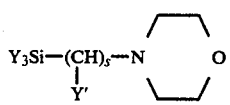
(V)

in which the radicals Y, which are identical or different, are each an alkyl or alkoxy radical containing from 1 to 4 carbon atoms, inclusive, at least two of the radicals Y being alkoxy radicals, each Y', which may be identical or different, is a hydrogen atom or an alkyl radical containing from 1 to 3 carbon atoms, inclusively, and s is an integer of from 3 to 10, inclusive.

As the silane of the formula (V), representative are:

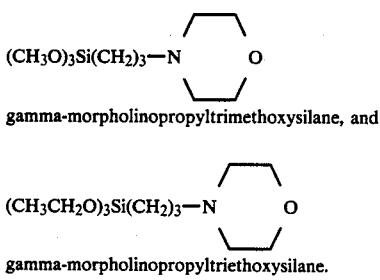

gamma-morpholinopropyltrimethoxysilane, and gamma-morpholinopropyltriethoxysilane.

These compounds and the process for their preparation are described by John L. Speier, *J. Org. Chem.*, 36, No. 21, page 3120, (1971).

The present invention also provides a process for the preparation of the CVE compositions according to which, under anhydrous conditions, the polymers (i) are prepared by the reaction of one mole of polymer of the formula (IV) with at least two moles of polyalkoxysilane (ii) in the presence of a catalytically effective amount of compound (v), after which the compounds (ii), (iii), (iv), (v), (vi) and (vii) are incorporated after reaction and optional devolatilization.

In general, the diorganopolysiloxanes having the formula (I) are known materials.

To prepare the diorganopolysiloxanes of formula (I), an exemplary starting organopolysiloxane is the copolymer of the formula:

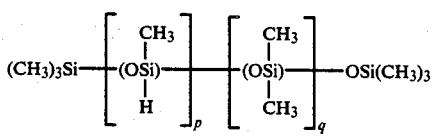

in which p and q are as defined above.

These copolymers are well known to the silicone art and are generally available commercially. They are described, for example, in U.S. Pat. Nos. 3,220,942, 3,341,111 and 3,436,366.

These hydromethylpolysiloxanes are reacted with an olefinically unsaturated alcohol of the formula WOH, in which W is a straight or branched chain alkylene radical containing from 2 to 18 carbon atoms. Among such alcohols, allyl alcohol and methallyl alcohol are representative, and a hydrosilylation platinum catalyst is employed therewith, in accordance with the teachings of U.S. Pat. Nos. 2,970,150 and 4,160,775.

Gamma-hydroxyalkylated polysiloxanes are prepared in this manner, many of which are available commercially and which are reacted with the diisocyanates of the formula:

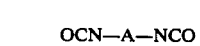

in which A has the same definition as in formula (I), in the presence of a catalyst, if desired.

Exemplary of such diisocyanates, representative are 2,4-tolylene diisocyanate, 2,6-tolylene diisocyanate, xylylene diisocyanates, 4,4'-diphenylmethane diisocyanate, p-isocyanatobenzyl isocyanate, m-phenylene diisocyanate, p-phenylene diisocyanate, 1,4-naphthalene diisocyanate, 1,5-naphthalene diisocyanate, ethylene diisocyanate, propylene diisocyanate, tetramethylene diisocyanate, pentamethylene diisocyanate, hexamethylene diisocyanate, dodecamethylene diisocyanate, 3,3'-diisocyanatodipropyl ether, 1,3-cyclopentylene diisocyanate, 1,4-cyclohexylene diisocyanate and furfurylidene diisocyanate.

The preferred diisocyanates are 2,4-tolylene diisocyanate and 2,6-tolylene diisocyanate and any mixtures thereof.

By "effective stabilizing amount" of the diorganopolysiloxane of formula (I) is intended an amount sufficient to neutralize the primary and secondary amine groups in the functionalization catalyst; such amount, easily determined by one skilled in this art, depends on the number of isocyanate groups per molecule of polysiloxane of formula (I), on the quantity of amine employed, on the optional devolatilization of the polymer (i) and on the more or less volatile nature of the amine.

For purposes of general guidance, it is possible, for example, to advantageously use 0.1 to 30 parts by weight of stabilizer (vi) of formula (I) per 100 parts of polymer (i).

The use of large amounts of the stabilizer of formula (I) presents no disadvantage, in view of the complete compatibility of the stabilizer (vi) with the CVE composition. These large amounts, e.g., 5 to 30 parts, may advantageously serve as a plasticizer.

In order to further illustrate the present invention and the advantages thereof, the following specific examples are given, it being understood that same are intended only as illustrative and in nowise limitative.

EXAMPLE 1

Synthesis of a diorganopolysiloxane having the average formula:

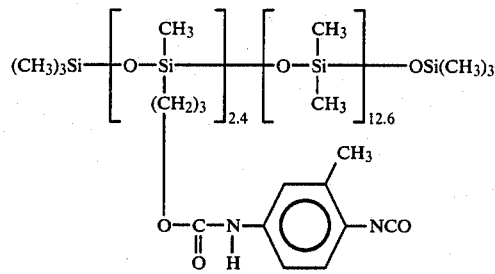

30.8 g of 2,4-tolylene diisocyanate dissolved in 50 ml of toluene were introduced into a 250 ml three-necked round flask, cooled in an ice bath, the inner volume of which was swept with a stream of nitrogen. The temperature was adjusted to 10° C. and a silicone oil of the average formula:

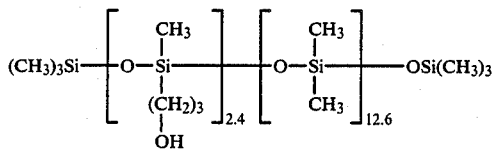

was introduced therein over ten minutes, while the temperature was maintained at 10° C.

The reaction was monitored by determining the residual NCO groups at hourly intervals. The reaction was stopped when the ratio of the residual NCO groups to the initial NCO groups (calculated in milliequivalents) became stable at a value of 50%, that is to say, after 4 hours, 45 minutes. The reaction mixture was devolatilized by heating to 50° C. for two hours.

This yielded the desired product in the form of a slightly cloudy orange-yellow oil. The reaction was virtually quantitative.

EXAMPLE 2

The following constituents were homogenized in a blender under anhydrous conditions:

(1) 100 parts of alpha-omega-dihydroxydimethylpolysiloxane oil having a viscosity of 175,000 mPa.s at 25° C.;

(2) 9 parts of methyl silicate; and (3) 0.5 parts of di-n-hexylamine.

The materials were heated for 20 minutes at 80° C. while being stirred, and the following were added without devolatilizing:

(4) 3 parts of gamma-morpholinopropyltrimethoxysilane;

(5) 0 or 6 parts of copolymer containing an isocyanate group, prepared in Example 1;

(6) 30 parts of plasticizer, which was a dimethylpolysiloxane oil blocked with a trimethysilyl radical at each end of the polymer chain, having a viscosity of 50 mPa.s at 25° C.;

(7) 9 parts of pyrogenic silica having a BET specific surface area of 150 m$^2$/g;

(8) 35 parts of calcium carbonate having a mean particle diameter of 5 micrometers; and (9) 0.1 part of dibutyltin dilaurate, added after the mixture had cooled.

The compositions, maintained protected against moisture, were divided into two batches.

In the case of the first batch, a layer 2 mm in thickness was spread in the open air onto a polyethylene plaque coated beforehand with a commercial detergent. In order to assess the setting time, note was made of the time (t) in min required for the layer to become non-tacky to the touch.

Shore A hardness was measured on 2- or 7-day old film (SAH 2 days) and (SAH 7 days), according to the standard NF-T-51109, as were, if appropriate, the tensile strength TS in MPa according to the standard NF-T-46002 and the elongation at break EB in % according to the standard NF-T-46002. The composition of the other batch was first subjected to an accelerated aging test by being placed in an anhydrous atmosphere in an oven at a temperature of 100° C. and for 2 days (48 hours). At the end of the test, after cooling to ambient temperature, measurements were carried out as in the case of the first batch.

The results are reported in Table I below, in which the amounts of stabilizer A prepared in Example 1 are given in parts per 100 parts of the original hydroxylated oil.

TABLE I

| A | 0 | | 6 | |
|---|---|---|---|---|
| AGING | No | Yes | No | Yes |
| t/min | 40 | 45 | 40 | 30 |
| SAH 2 d | 23 | 11 | 25 | 22 |
| SAH 7 d | 24 | 25 | 27 | 26 |
| TS MPa | 3.3 | 1.7 | 1.9 | 2.3 |
| EB % | 465 | 481 | 345 | 535 |

EXAMPLE 3

The procedure of Example 1 was repeated, except that the following materials were mixed and heated to 80° C. for 20 minutes:

(1) 100 parts of alpha,omega-dihydroxydimethylpolysiloxane oil having a viscosity of 20,00 mPa.s at 25° C.;

(2) 9 parts of methyl silicate; and (3) 0.5 part of di-n-hexylamine.

The following were added after cooling to 20°-25° C.:

(4) 0 to 8 parts of the same additive A of Example 1;

(5) 2 parts of gamma-morpholinopropyltrimethoxysilane;

(6) 10 parts of pyrogenic silica having a BET specific surface area of 60 m$^2$/g; and (7) 0.15 part of dibutyltin dilaurate.

The results are reported in Table II below:

TABLE II

| A | 0 | | 8 | |
|---|---|---|---|---|
| AGING | No | Yes | No | Yes |
| t/min | 22 | 25 | 15 | 15 |
| SAH 2 d | 22 | 10 | 22 | 25 |
| SAH 7 d | 32 | 14 | 29 | 30 |
| TS MPa | 1.7 | 1.4 | 1.8 | 2.0 |
| EB % | 251 | 477 | 320 | 291 |

The stabilizing action of the diorganopolysiloxane A will clearly be seen from Tables I and II.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A single-component, storage-stable organopolysiloxane CVE composition of matter, comprising:
   (i) 100 parts of at least one diorganopolysiloxane polymer of the formula:

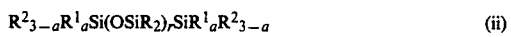

in which each R, which may be identical or different, is a hydrocarbon radical containing from 1 to 10 carbon atoms, or a substituted such hydrocarbon radical bearing at least one halogen atom or cyano group substituent, each $R^1$, which may be identical or different, is a $C_2$-$C_{10}$ hydrocarbon radical, each $R_2$, which may be identical or different, is an alkoxy or polyalkoxy radical of the formulae ZO or ZOEO, in which Z is a $C_1$-$C_4$ alkyl radical, E is a straight or branched chain $C_2$-$C_4$ alkylene radical, a is zero or 1 and the symbol r is a number such that the polymer of the formula (II) has a viscosity of from 500 to 1,000,000 mPa.s at 25° C.;
   (ii) 0 to 15 parts of at least one polyalkoxysilane of the formula:

in which $R^1$, $R^2$ and a are as defined above;
   (iii) 0 to 250 parts of inorganic filler material;
   (iv) 0.001 to 3 parts of a condensation catalyst;
   (v) 0.001 to 15 parts of at least one amino compound bearing at least one primary or secondary amine group and comprising an organic amine having a pKb of less than 5 in aqueous media, or an aminoorganosilane or aminoorganopolysiloxane simultaneously bearing, per molecule:
      (a) at least one $C_3$-$C_{15}$ organic radical bonded to the silicon atom by an SiC bond and bearing at least one amino group, and
      (b) at least one $C_1$-$C_6$ alkoxy radical or a $C_3$-$C_6$ alkoxyalkyleneoxy radical; and
   (vi) an effective stabilizing amount of at least one diorganopolysiloxane of the formula:

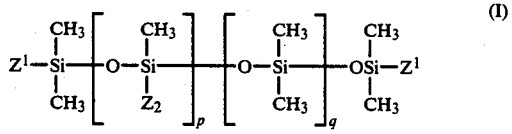

in which:
   p is an integer of from 1 to 6;
   q is an integer of from 0 to 500;
   the radicals $Z^1$, which may be identical or different, are each a methyl radical or a radical $Z^2$; and
   $Z^2$ is a radical of the formula:

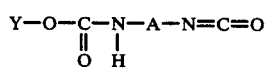

in which:
   Y is a straight or branched chain alkylene radical containing from 1 to 18 carbon atoms, optionally extended by a polyethylene oxide or polypropylene oxide block, and A is a divalent hydrocarbon radical containing from 2 to 20 carbon atoms.

2. The composition of matter as defined by claim 1, wherein said diorganosiloxane (vi) having the formula (I) ranges from 2 to 4, and q ranges from 5 to 50.

3. The composition of matter as defined by claim 1, wherein said diorganopolysiloxane (vi) having the formula (I), $Z^1$ is methyl, and A is:

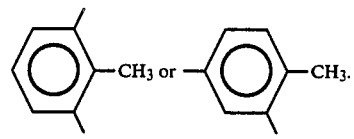

4. The composition of matter as defined by claim 3, wherein said diorganopolysiloxane (vi) having the formula (I), Y is 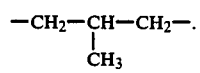 or $$-CH_2-\underset{\underset{CH_3}{|}}{CH}-CH_2-.$$

5. The composition of matter as defined by claim 1, comprising from 0.1 to 30 parts of said diorganopolysiloxane (vi).

6. The composition of matter as defined by claim 1, wherein said condensation catalyst (iv) comprises a tin catalyst.

7. The composition of matter as defined by claim 1, further comprising from 0.5 to 10 parts of at least one aminoorganosilane or aminoorganopolysiloxane compound (vii) bearing, per molecule, at least one $C_3$-$C_{15}$ organic radical linked by an SiC bond to the silicon atom and substituted by at least one tertiary amine and-/or quanidino radical and at least one $C_1$-$C_5$ alkoxy group or $C_3$-$C_6$ alkoxyalkyleneoxy radical.

8. The composition of matter as defined by claim 7, wherein said compound (vii) has the formula:

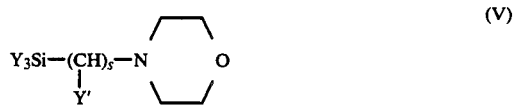

in which the radicals Y, which may be identical or different, are each an alkyl or alkoxy radical containing from 1 to 4 carbon atoms, at least two of which radicals Y being alkoxy radicals, the radicals Y', which may be identical or different, are each a hydrogen atom or an alkyl radical containing from 1 to 3 carbon atoms, and s is an integer of from 3 to 10.

9. The composition of matter as defined by claim 1, wherein said condensation catalyst (iv) comprises a diorganotin bis($\beta$-diketonate) with an organotin compound, also of valency (IV), but devoid of $\beta$-diketonato group, and including at least one tin atom, each such tin atom bearing two organic radicals linked by a Sn—C bond, the remaining two valencies being satisfied by organic or inorganic radicals linked by an SnO or SnS bond, by halogen atoms, by hydroxyl groups, or by oxygen atoms.

10. The composition of matter as defined by claim 1, comprising from 2.5 to 10 parts of said polyalkoxysilane (ii).

11. The composition of matter as defined by claim 1, in cured elastomeric state.

12. A shaped article comprising the cured elastomer as defined by claim 11.

* * * * *